J. F. HAEPPNER.
SPRING TIRE.
APPLICATION FILED JUNE 1, 1914.

1,126,631.

Patented Jan. 26, 1915.

WITNESSES

INVENTOR
JOHN FLORENTIN HAEPPNER,
BY Munn & Co.
ATTORNEYS

UNITED STATES PATENT OFFICE.

JOHN FLORENTIN HAEPPNER, OF EAST ST. LOUIS, ILLINOIS, ASSIGNOR OF ONE-HALF TO ANNA M. SMITH, OF EAST ST. LOUIS, ILLINOIS.

SPRING-TIRE.

1,126,631.

Specification of Letters Patent. Patented Jan. 26, 1915.

Application filed June 1, 1914. Serial No. 842,064.

*To all whom it may concern:*

Be it known that I, JOHN F. HAEPPNER, a citizen of the United States, residing at East St. Louis, in the county of St. Clair and State of Illinois, have invented a new and useful Improvement in Spring-Tires, of which the following is a specification.

This invention relates to resilient tires, and more particularly to an improved spring tire.

One of the principal objects of the invention is to provide a spring tire including an inner fixed rim, an outer movable rim connected to and spaced from the inner rim at a plurality of points by circular band springs, and a cover or guard plate connected to the inner rim and adapted to prevent the entrance of dust or dirt between the rims.

Another object of the invention is to provide a tire of the class described including a movable and immovable rim, and springs connecting them at a plurality of points, the construction and arrangement of the springs being such as to equalize and distribute the tension incident to movement of one rim relatively to the other.

A further object of the invention is to provide an improved tire of the class described which may be applied to wheels of standard dimensions, or fitted especially to odd size wheels, and one which will be extremely simple, durable, efficient in operation, and inexpensive to manufacture.

Figure 1:
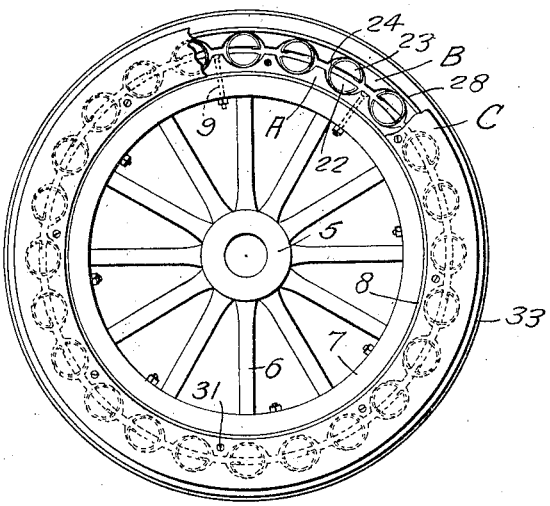
Figure 2:
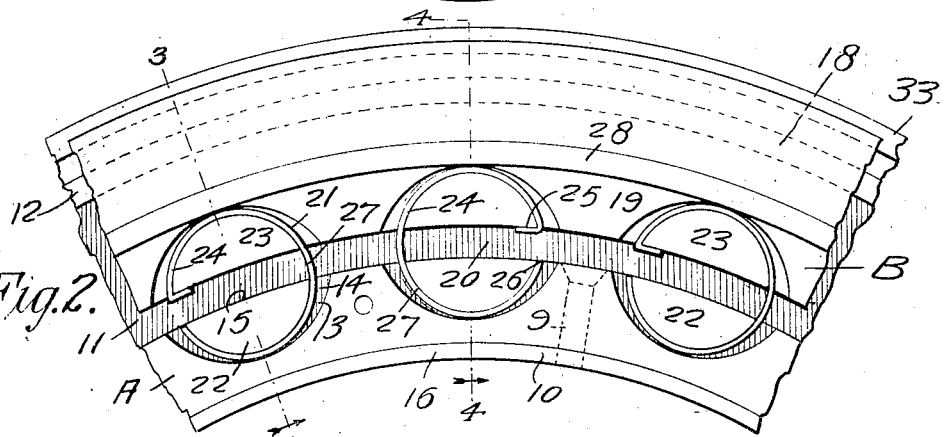
Figure 3:
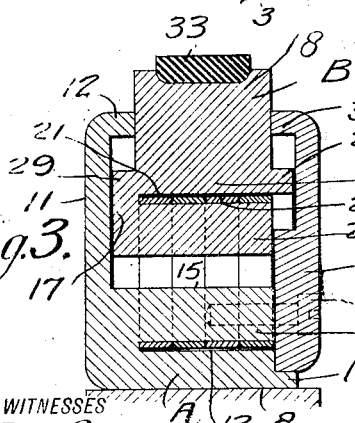
Figure 4:
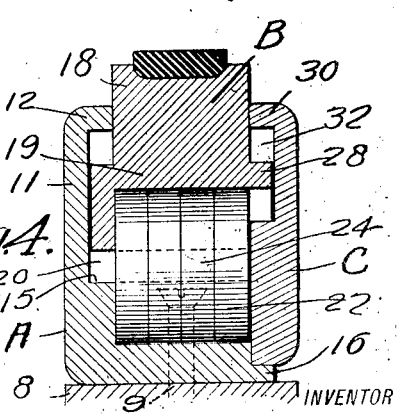

With these and other objects in view the invention resides in the construction, combination and arrangement of parts hereinafter more fully described and claimed, and illustrated in the accompanying drawing, in which like characters of reference indicate like parts throughout the several figures, of which:

Figure 1 represents a side elevational view of a vehicle wheel equipped with my improved spring tire, a portion of the guard plate being broken away to reveal the rims. Fig. 2 represents a fragmentary side elevational view of the tire, the guard plate having been removed. Fig. 3 represents a transverse sectional view taken on the plane indicated by the line 3—3 of Fig. 2, the guard plate being shown in place, and Fig. 4 represents a view similar to Fig. 3 taken on the plane indicated by the line 4—4 of Fig. 2.

Referring more particularly to the drawing, 5 represents the hub, 6 the spokes, 7 the felly, and 8 the tire or rim of a wheel of ordinary construction, upon which as indicated in Fig. 1 my improved spring tire is mounted.

The spring tire includes an inner rim A, an outer rim B and a guard rim or plate C, rim A being connected to the rim of the wheel at suitable intervals by means of bolts or screws 9. Rim A has an inner flat surface 10 adapted to rest against the rim 8 of the wheel and is provided at one edge with an annular flange 11, extending at right angles to the rim, which flange 11 at its outer edge is turned inwardly to form a marginal flange 12 which overhangs the body portion of rim A in spaced and parallel relation therewith. At predetermined spaced intervals the outer edge of the body of rim A is provided with arcuate recesses 13, which are of such a depth as to extend from the outer surface of the body portion beyond the central part thereof, said recesses gradually increasing in width from their central portions to their ends 14, and as shown the ends of the recesses terminate in the upper surface 15 of rim A. On the opposite side of rim A from flange 11, and along the inner edge of said rim is provided a marginal flange 16.

Rim B is movable relatively to rim A, and is disposed with one edge 17 resting against flange 11, the tread portion 18 of the rim which is less in width than the body portion 19 thereof, extending beyond flange 12, and abutting at one side against said flange. The inner diameter of rim B is somewhat greater than the outer diameter of the body portion of rim A, so that a space 20 is left between them, and the body portion of rim B is provided at spaced intervals with deep arcuate recesses 21 which correspond with and are oppositely disposed with relation to recesses 13, and said recesses together with recesses 21 serve to form lugs 22 and 23 carried respectively by rim A and rim B, said lugs being disposed in pairs around the spring tire, and disposed within each pair of recesses and connecting the adjacent lugs is a set of substantially circular band springs 24, whose curvature conforms with the curvature of the outer surfaces of the lugs, so as to snugly and tightly fit them, each set 24 comprising a number of circular springs, and the springs at one end are bent over as at 25 into engagement with lug 23 for maintaining the springs in place, the opposite ends 26 of the springs, lying flush with the surface of the inner rim. The sets of springs 24 are disposed in pairs, that is a solid portion 27 of one set which bridges the space 20 between the rims, disposed toward the solid portion 27 of the other member of the pair, this arrangement being clearly indicated with Fig. 1 and 2. By this arrangement the outer rim B is maintained in spaced relation with the inner rim by the sets of band springs, and it is evident that upon movement of one of the rims relatively to the other, tension incident to the movement will be taken up and distributed to the various sets of springs thus equalizing and distributing the tension through the circumference of the tire, thus insuring the liveliness and resiliency of the tire, and at the same time lengthening the life of the springs by reason of the distribution of the tension.

The outer or opposite edge of rim B from edge 17, is provided with an annular flange 28, whose inner or lower edge is substantially tangent to the upper edges of recesses 21, and said flange 28 together with the upper portion 29 of the inner edge 17, forms shoulders encircling rim B on each side thereof, and said shoulders are adapted to limit the outward movement of rim B relatively to rim A, by coacting with the flange 12 carried by rim A and overhanging shoulder 29, and a flange 30 carried by the cover or guard plate C and overhanging shoulder 28, said guard plate at its inner edge resting against flange 16 on rim A, and being connected to said rim by means of screws or other suitable fastening means 31, said guard plate or ring at its inner surface being provided with an annular recess 32, which forms the flange 30 at the outer edge of the guard plate and in which groove the flange 28 is adapted to play. The guard plate maintains rim B against the flanges 11 and 12 carried by rim A, and in turn engages snugly against rim B so that no dust or dirt may enter between rims A, and B and ring C.

The spring tire is adapted to be placed upon a vehicle wheel with the guard ring C on the outside, so that it may be easily removed for purposes of repairing and cleaning the tire, and when the guard ring is removed the springs are exposed and are readily accessible for renewal or repair. Rim B may if desired be provided with a rubber or other suitable tread in the form of a band 33.

The number and width of the springs forming each set may be varied at the option of the user, and although I have shown and described the sets as being substantially circular, the shape of the springs may be varied, and such other changes in the construction, combination and arrangement of the parts of the device may be made, as do not depart from the spirit of the invention and the scope of the appended claims.

I claim:

1. A spring tire including an inner rim, an outer rim, said rims at spaced intervals being recessed on one side to provide pairs of oppositely disposed lugs, band springs connecting said lugs, said springs at one end being bent upon the lugs carried by one of the rims, and at the opposite end lying flush with the inner surface of the opposite rim, means for limiting the movement of one of the rims relatively to the other, and means for preventing the entrance of dust between the rims.

2. A spring tire comprising a pair of spaced rims disposed one within the other and being of uniform internal and external diameter, said rims at spaced intervals being provided with uninterrupted arcuate recesses let into the sides of the rims, band springs disposed in the recesses and connecting the rims, a guard ring and a flange carried by one of the rims in spaced relation to each other, and coacting means between the ring and flange and the outer rim, for limiting the movement of the latter and preventing entrance of dust between the rims.

JOHN FLORENTIN HAEPPNER.

Witnesses:
 FRED ROBERTS,
 H. LEROY BROWNING.